United States Patent
Kawamura

(10) Patent No.: US 8,414,171 B2
(45) Date of Patent: Apr. 9, 2013

(54) VEHICLE LIGHTING DEVICE

(75) Inventor: Takayuki Kawamura, Tokyo (JP)

(73) Assignee: Ichikoh Industries, Ltd., Tokyo (JP)

( * ) Notice: Subject to any disclaimer, the term of this patent is extended or adjusted under 35 U.S.C. 154(b) by 335 days.

(21) Appl. No.: 12/556,993

(22) Filed: Sep. 10, 2009

(65) Prior Publication Data

US 2010/0073950 A1 Mar. 25, 2010

(30) Foreign Application Priority Data

Sep. 24, 2008 (JP) ................................ 2008-243718

(51) Int. Cl.
*F21V 21/00* (2006.01)

(52) U.S. Cl. ........ 362/545; 362/546; 362/547; 362/548; 362/549

(58) Field of Classification Search ........... 362/459–549
See application file for complete search history.

(56) References Cited

U.S. PATENT DOCUMENTS

2003/0201462 A1* 10/2003 Pommer et al. ................ 257/200
2004/0202007 A1* 10/2004 Yagi et al. ...................... 362/545
2008/0285297 A1* 11/2008 Ishida ............................ 362/539

FOREIGN PATENT DOCUMENTS

JP          2007-109613 A      4/2007

* cited by examiner

Primary Examiner — William Carter
(74) Attorney, Agent, or Firm — Foley & Lardner LLP

(57) ABSTRACT

A periphery of a projecting lens is heated due to radiation heat exerted by light emitted from a light source, like peripheries of the light source and a reflector. However, a lens holder holding the projecting lens is integrally molded with a heat sink member, so that a heat at the periphery of the projecting lens is well transmitted to the heat sink member by means of the lens holder, and is efficiently radiated by means of the heat sink member.

3 Claims, 5 Drawing Sheets

VEHICLE LIGHTING DEVICE

CROSS-REFERENCE TO RELATED APPLICATIONS

This application claims priority of Japanese Patent Application No. 2008-243718 filed on Sep. 24, 2008. The contents of this application are incorporated herein by reference in their entirety.

BACKGROUND OF THE INVENTION

1. Field of the Invention

The present invention relates to a vehicle lighting device employed in a rear combination lamp or a fog lamp, etc., including an automobile headlamp, and in particular, to a projector-type vehicle lighting device in which direct light from a light source and light reflected by a reflector are focused by means of a projecting lens, and are radiated to the forward direction of a vehicle.

2. Description of the Related Art

Conventionally, as disclosed in Japanese Laid-open Patent Application No. 2007-109613, a projector-type vehicle lighting device is known as the one that constitutes a light source unit by integrally molding a lens holder for holding and fixing a projecting lens and a reflector with an appropriate synthetic resin material and assembling them with a heat sink member in which a light source made of a semiconductor-type light emitting element such as an LED is arranged.

In the conventional vehicle lighting device, a light source is arranged in a heat sink member, thus improving a heat radiation effect at the periphery of the light source, whereas a lens holder is made up of a synthetic resin material provided separately, thus increasing a temperature at the periphery of a projecting lens. Due to this temperature difference, a lens holder portion may be slightly thermally deformed.

In addition, the semiconductor-type light emitting element has a small heat value in comparison with a halogen lamp or an HID lamp (High Intensity Discharge lamp). Therefore, in recent years, a synthetic resin-based lens which is lighter than a glass lens in weight has been used as a projecting lens more frequently. In a case where this synthetic resin lens is employed as a projecting lens, distortion may occur to the projecting lens due to the aforementioned thermal effect.

Thus, if the lens holder portion is slightly deformed due to the thermal effect at the periphery of the projecting lens, or alternatively, if slight distortion occurs to the projecting lens itself, slight aberration occurs to an optical design between the projecting lens and the light source and the reflector, adversely affecting light distribution performance.

Therefore, the present invention aims to provide a projector-type vehicle lighting device which is capable of improving an overall heat radiation effect of a light source unit and eliminating a temperature difference between the periphery of a light source and the periphery of a projecting lens.

SUMMARY OF THE INVENTION

A first aspect of the present invention is directed to a vehicle lighting device, comprising:
(i) a light source;
(ii) a reflector for reflecting a part of light emitted from the light source toward a forward direction of the lighting device;
(iii) a projecting lens for focusing direct light from the light source and light reflected by the reflector to radiate the focused rays of light to the forward direction of the lighting device; and
(iv) a heat sink member in which optical members including the light source and the reflector and a projecting lens are intensively disposed, wherein:
the light source and the reflector each are fixed and disposed on a predetermined mount face formed on the heat sink member; and
the projecting lens is held and fixed by a lens holder at a peripheral edge part thereof, and the lens holder is integrally molded with the heat sink member.

A second aspect of the present invention is directed to the vehicle lighting device according to the first aspect, wherein:
the lens holder comprises:
a ring-shaped holder portion having formed therein an annular groove with which a peripheral edge flange portion of the projecting lens engages; and
a plurality of connecting arm portions for connecting the holder portion and the heat sink member to each other.

A third aspect of the present invention is directed to the vehicle lighting device according to the second aspect, wherein:
the annular groove of the holder portion is formed as a stepped groove at a front-end inner periphery of the holder portion; and
the peripheral edge flange portion of the projecting lens is held and fixed between the stepped groove and a retainer ring securely attached to a front-end face of the holder portion.

A fourth aspect of the present invention is directed to the vehicle lighting device according to the first or second aspect, wherein:
the light source, the reflector, and the projecting lens are combined in one light source unit;
said one light source unit is provided in plurality in the single heat sink member; and
the reflector in a respective one of the light source units and the holder portion of the lens holder are integrally connected to each other.

A fifth aspect of the present invention is directed to a vehicle lighting device, comprising:
(i) a light source;
(ii) a reflector for reflecting light from the light source as reflection light;
(iii) a projecting lens for focusing direct light from the light source and light reflected by the reflector in a luminous flux to radiate the focused rays of light to a forward direction of the lighting device; and
(iv) a heat sink member in which the light source and the reflector are mounted, for radiating a heat of the light source,
the vehicle lighting device including a lens holder for holding and fixing a peripheral edge of the projecting lens, wherein:
the lens holder is comprised of a structure of radiating a heat at a periphery of the projecting lens by means of the heat sink member.

A sixth aspect of the present invention is directed to the vehicle lighting device according to the fifth aspect, wherein:
the lens holder is comprised of a structure which is integral with the heat sink member.

A seventh aspect of the present invention is directed to the vehicle lighting device according to the fifth aspect, wherein:
the lens holder is integrally molded with the heat sink member.

An eighth aspect of the present invention is directed to the vehicle lighting device according to the fifth aspect, wherein:
the lens holder includes a connecting arm portion for connecting the lens holder and the heat sink member to each other while forming an open space between the lens holder and the heat sink member.

A ninth aspect of the present invention is directed to the vehicle lighting device according to the fifth aspect, wherein:

the lens holder includes a ring-shaped holder portion for holding and fixing a peripheral edge of the projecting lens; and the holder portion has an annular groove formed to engage with the peripheral edge of the projecting lens.

A tenth aspect of the present invention is directed to the vehicle lighting device according to the fifth aspect, wherein:

the lens holder includes:

a ring-shaped holder portion having a stepped groove which engages with the peripheral edge of the projecting lens; and a retainer ring to be fixed to a front-end face of the holder portion, and the stepped groove and the retainer ring, of the holder portion, hold and fix the peripheral edge of the projecting lens between the stepped groove and the retainer ring, of the holder portion, so that the lens holder holds and fixes the peripheral edge of the projecting lens.

An eleventh aspect of the present invention is directed to the vehicle lighting device according to the fifth aspect, wherein:

a first light source and a second light source each are provided as the light source;

the heat sink member includes a respective one of the mount faces extending from both sides of the heat sink member toward the lens holder and mounting the first light source and the second light source;

the lens holder includes a connecting arm portion for connecting the lens holder and the heat sink member to each other while forming an open space between the lens holder and the heat sink member; and the connecting arm portion is extended from a respective one of the mount faces of the heat sink member toward the lens holder.

A twelfth aspect of the present invention is directed to a vehicle lighting device, comprising:

(i) a first light source and a second light source;

(ii) a reflector for reflecting rays of light from the first and second light sources as rays of reflection light;

(iii) a projecting lens for focusing rays of direct light from the first and second light sources and the reflected rays of light in a luminous flux to radiate the focused rays of light to a forward direction of the lighting device;

(iv) a heat sink member in which the first and second light sources and the reflector are mounted, for radiating heats from the first and second light sources; and (v) a lens holder for holding and fixing a peripheral edge of the projecting lens, wherein:

the heat sink member includes a respective one of mount faces extending from both sides of the heat sink member toward the lens holder and mounting the first light source and the second light source; and the lens holder is comprised of a structure extended from the respective one of the mount faces of the heat sink member and radiating a heat at a periphery of the projecting lens by means of the heat sink member.

A thirteenth aspect of the present invention is directed to the vehicle lighting device according to the twelfth aspect, wherein:

the lens holder is comprised of a structure which is integral with the heat sink member A fourteenth aspect of the present invention is directed to the vehicle lighting device according to the twelfth aspect, wherein:

the lens holder is integrally molded with the heat sink member

A fifteenth aspect of the present invention is directed to the vehicle lighting device according to the twelfth aspect, wherein:

the lens holder includes a connecting arm portion which is extended from a respective one of the mount faces of the heat sink member toward the lens holder, for connecting the lens holder and the heat sink member while forming an open space between the lens holder and the heat sink member.

A sixteenth aspect of the present invention is directed to the vehicle lighting device according to the twelfth aspect, wherein:

the lens holder includes a ring-shaped holder portion for holding and fixing the peripheral edge of the projecting lens; and the holder portion has an annular groove formed to engage with the peripheral edge of the projecting lens.

A seventeenth aspect of the present invention is directed to the vehicle lighting device according to the twelfth aspect, wherein:

the lens holder includes:

a ring-shaped holder portion having a stepped groove which engages with the peripheral edge of the projecting lens; and a retainer ring to be fixed on a front-end face of the holder portion, and the stepped groove and the retainer ring, of the holder portion, hold and fix the peripheral edge of the projecting lens between the stepped groove and the retainer ring, of the holder portion, so that the lens holder holds and fixes the peripheral edge of the projecting lens.

According to the present invention, a heat of which a temperature has risen at the periphery of a projecting lens is also well thermally transmitted from a lens holder integrally molded with a heat sink member to the heat sink member, and is efficiently radiated by means of the heat sink member, so that a temperature difference from the periphery of a light source can be substantially eliminated.

As a result, temperature regulation at the periphery of the projecting lens can be thoroughly performed, a conventional slight displacement between the projecting lens and the light source and a reflector due to a thermal effect never arises, and the lowering of light distribution performance due to the thermal effect can be avoided In addition, even in a case where the projecting lens is a synthetic resin lens, the heat at the periphery of the projecting lens can be efficiently radiated by means of the heat sink member, as described previously, so that an occurrence of distortion due to the thermal effect of the projecting lens can be avoided.

Further, the projecting lens is held and fixed by a lens holder integrally molded with the heat sink member, so that a displacement due to an error of assembling between the projecting lens and the light source and the reflector can also be avoided, thus making it possible to improve light distribution performance in combination with the heat radiation effect described previously.

DESCRIPTION OF THE PREFERRED EMBODIMENTS

Figure 1:
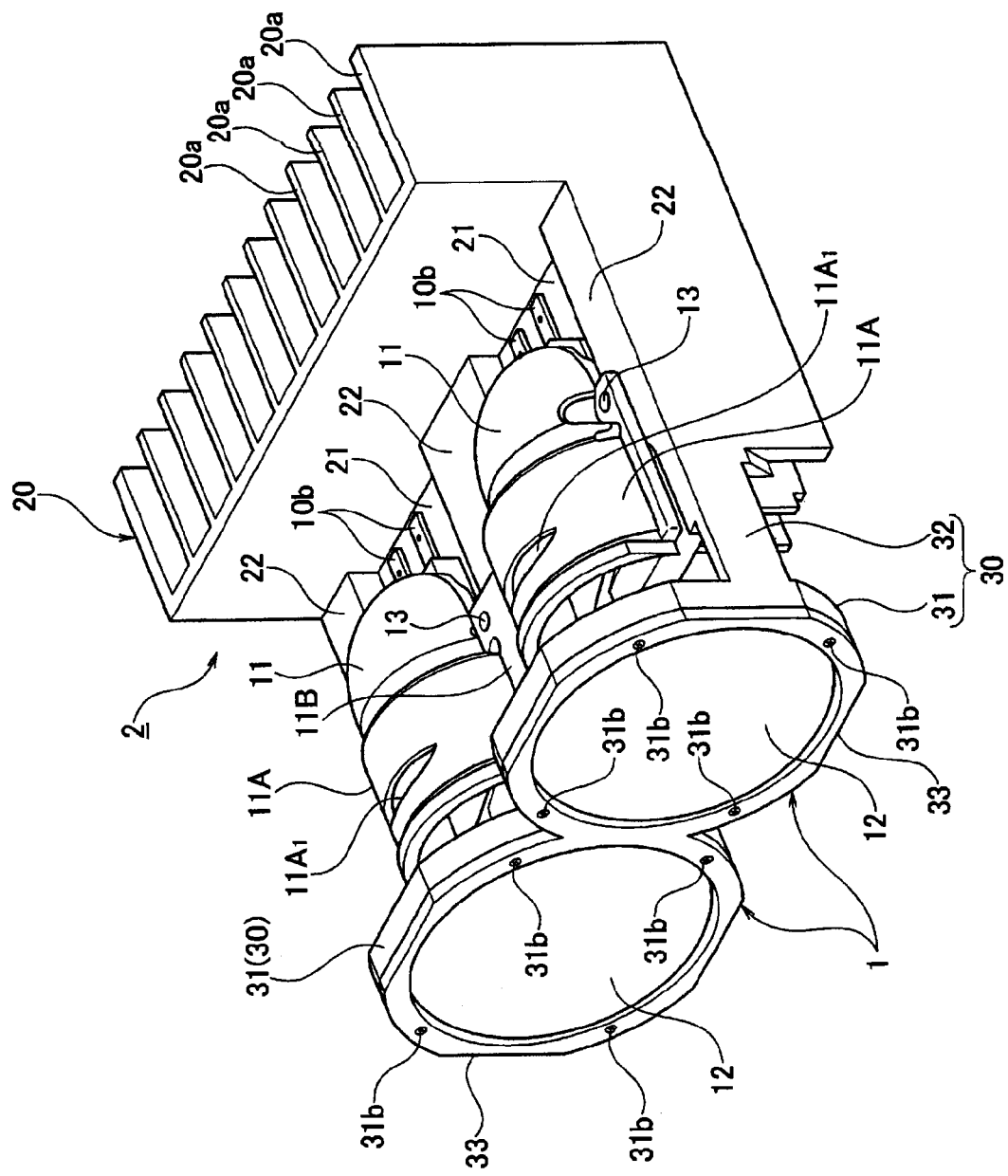
FIG. 1 is a perspective view showing a lighting unit in one embodiment of the present invention.

Hereinafter, taking an example of a vehicle headlamp, one embodiment of the present invention will be described in detail referring to the drawings.

Figure 2:
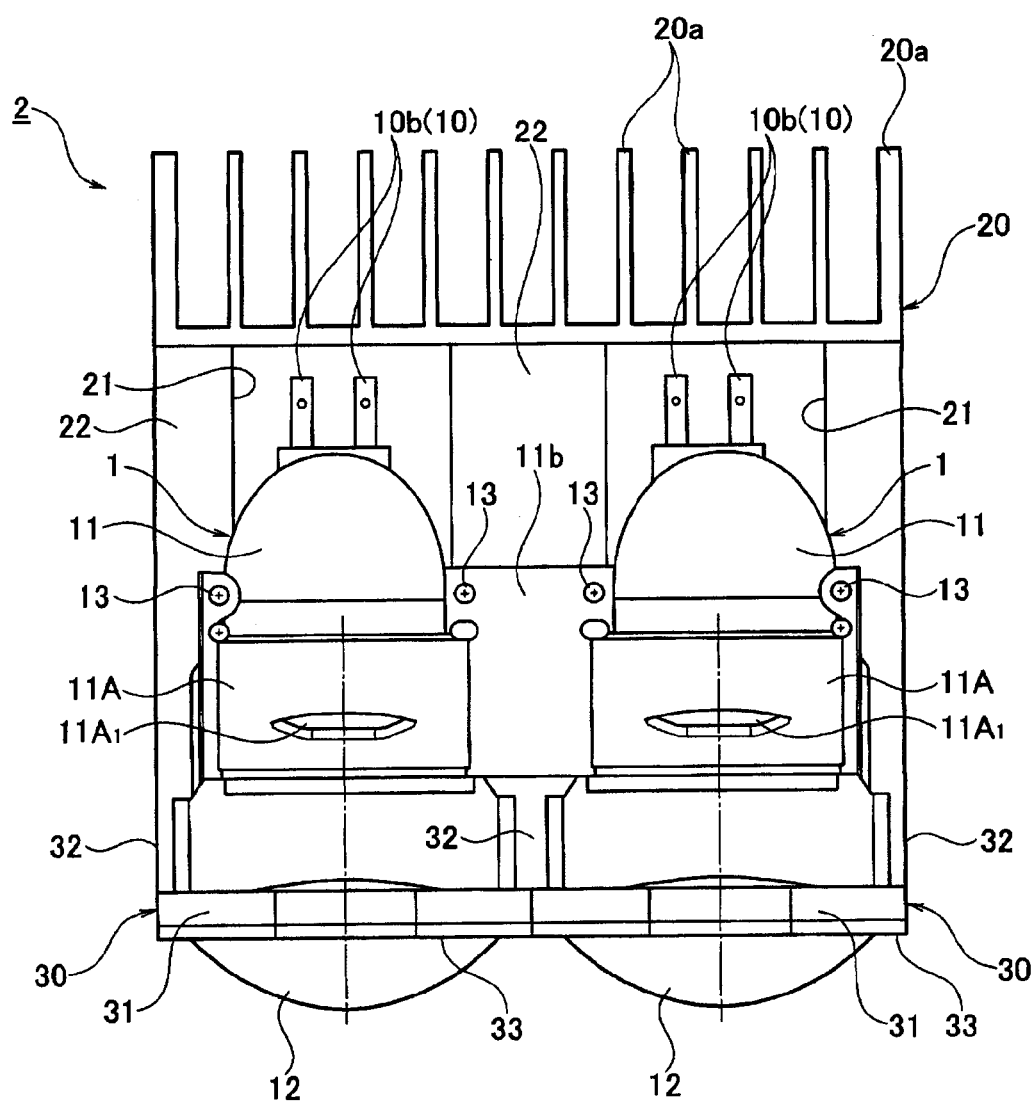
FIG. 2 is a plan view of a lighting unit shown in FIG. 1.
Figure 3:
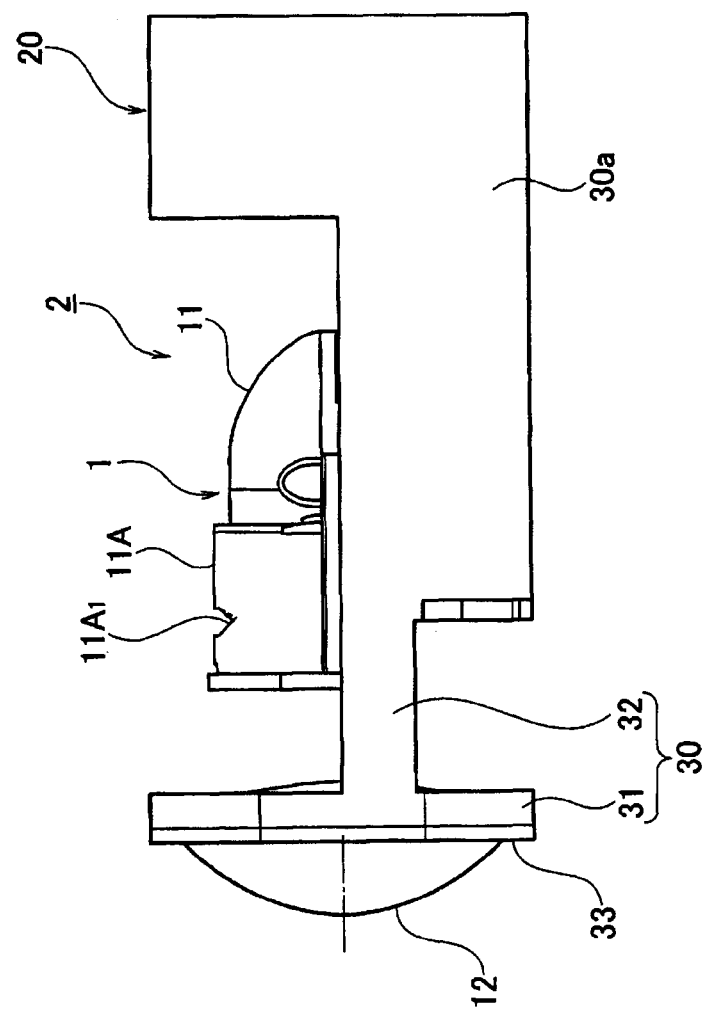
FIG. 3 is a side view of a lighting unit shown in FIG. 1.
Figure 4:
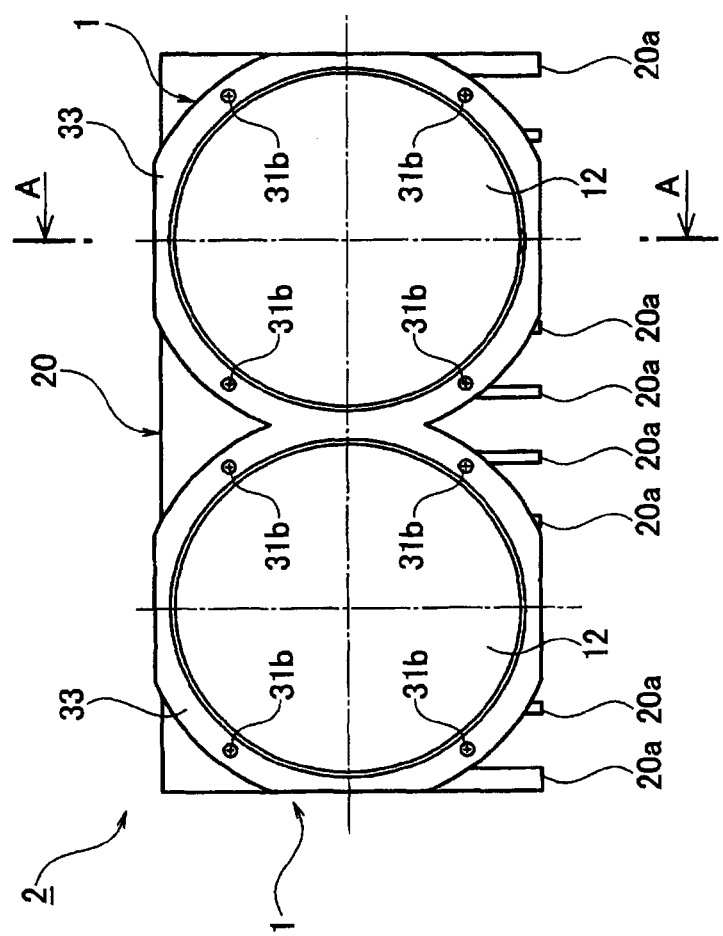
FIG. 4 is a front view of a lighting unit shown in FIG. 1.
Figure 5:
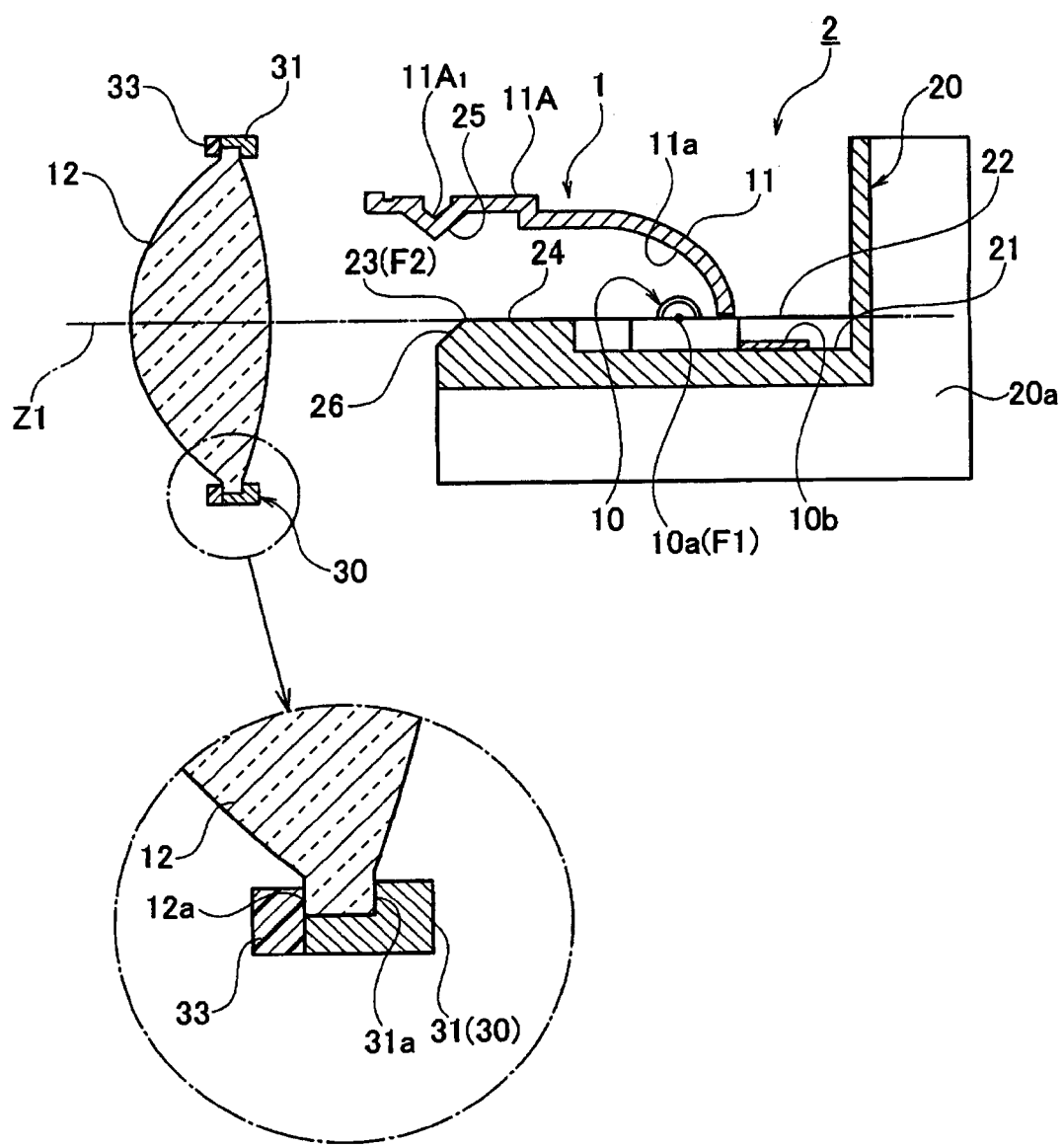
FIG. 5 is a sectional view taken along the line A-A of FIG. 4.

FIG. 1 is a perspective view showing a lighting unit in a headlamp, according to one embodiment of the present invention; FIG. 2 is a plan view of the lighting unit shown in FIG. 1; FIG. 3 is a side view of the lighting unit shown in FIG. 1; FIG. 4 is a front view of the lighting unit shown in FIG. 1; and FIG. 5 is a sectional view taken along the line A-A of FIG. 4.

The lighting unit in the headlamp, shown in FIGS. 1 to 5, is constituted as a projector-type lighting unit using a semiconductor-type light source as a light source. This lighting unit is provided with: a semiconductor-type light source 10; a reflector 11 having a concaved reflecting surface 11a for reflecting a part of the light emitted from the semiconductor-type light source 10; a projecting lens 12 for focusing the direct light from the semiconductor-type light source 10 and the reflected light from the reflector 11 to radiate them to the forward direction of the lighting device; and a heat sink member 20 in which the semiconductor-type light source 10, the reflector 11, and the projecting surface 12 are intensively arranged.

A light source unit 1 is made up of the semiconductor-type light source 10, the reflector 11, and the projecting lens 12; and the lighting unit 2 is constituted in combination between the light source unit 1 and the heat sink member 20.

The lighting unit 2 is then arranged in a lamp room formed of a lamp housing and a transparent outer lens, although not shown, and a headlamp is constituted.

The reflecting surface 11a of the reflector 11 is made of an elliptical reflecting surface or an ellipse-based reflecting surface, for example a rotational elliptical surface or an ellipse-based free curved surface. In the vertical cross-section of FIG. 5, the reflecting surface 11a of the reflector 11 has a semi-elliptical shape formed by halving an ellipse along a long axis of the reflecting surface, and a semi-cylindrical hood portion 11A is provided at a front-end side of the reflecting surface 11a.

This reflector 11 is formed of an optically-impermeable, synthetic resin material, and the reflecting surface 11 a is formed by applying aluminum vapor deposition or silver coating to an interior face of the reflector 11.

The reflecting surface 11 a of the reflector 11 is provided with a first focal point F1 and a second focal point F2, and a light emitting portion 10a of the semiconductor-type light source 10 is disposed at or near the focal point F1. In this manner, among the rays of light emitted from the semiconductor-type light source 10, those reflected by the reflecting surface 11a of the reflector 11 are focused at or near the second focal point F2 of the reflector 11.

The semiconductor-type light source 10 is a light source utilizing luminescence obtained by applying a voltage to a semiconductor, such as a light emitting diode (LED) or electroluminescence including an organic EL and an inorganic EL, for example.

The projecting lens 12 is a convex lens of which at least one side face has a spherical or substantially spherical shape. In the embodiment, the faces of both sides of the projecting lens 12 have a convex-type substantially spherical shape, and a side face (front face) at the front side of the lighting device has a small curvature radius in comparison with a side face (rear face) at the rear side of the lighting device. The shape of the projecting lens 12 is not limitative thereto, and may be like a convex lens in which the thickness in an optical-axis direction of the lens becomes smaller from the center to the outer periphery of the lens, for example like a flat convex lens in which the side face (rear face) at the rear side of the lighting device is a substantially flat face.

This projecting lens 12 has a horizontal or substantially horizontal lens optical axis Z1, and the first focal point F1 and the second focal point F2 of the reflector 11 are set on this lens optical axis Z1. In this manner, the luminous flux that is convergent at or near the second focal point F2 of the reflector 11 is condensed as a luminous flux which is parallel or substantially parallel to the lens optical axis Z1 when it passes through the projecting lens 12, and the condensed luminous flux is projected to the forward direction of the lighting device.

The semiconductor-type light source 10 has a small heat value in comparison with a halogen lamp or an HID lamp (High Intensity Discharge lamp). Thus, a synthetic resin-based lens which is lighter than a glass lens in weight, for example an acrylic lens is used as the projecting lens 12.

The heat sink member 20 is made of a metal material with high thermal conductivity, for example a die cast, and is formed in a substantially L-shaped cross section. From the lower face to the rear face of the heat sink member, a plurality of heat radiation fins 20a are appropriately arrayed with equal intervals in the vehicle widthwise direction.

This heat sink member 20 also serves as a base on which the light source 10, the reflector 11, and the projecting lens 12 are intensively disposed, and radiates the heat generated by the light source 10, A top face of a substantially horizontal portion formed in the L-shaped cross section is formed to be flat, and a mount face 21 of the semiconductor-type light source 10 and a mount face 22 of the reflector 11 are formed.

The semiconductor-type light source 10 is fixed and disposed substantially horizontally in place in which, with the light emitting portion being upward on the mount face 21, the center of light emission is at or near the first focal point F1 of the reflector 11. Therefore, this mount face 21 is stepped and molded to be lower by one step at a depth to an extent such that the center of light emission from the semiconductor-type light source 10 can be taken on the lens optical axis Z1 with respect to the mount face 22 of the reflector 11. In FIGS. 1 and 2, reference numeral 10b designates a terminal of the semiconductor-type light source 10.

On the other hand, the reflector 11 is tightened and fixed on the mount face 22 by means of screws 13 while the upper and rear parts of the semiconductor-type light source 10 are covered; and a general top face of the heat sink member 20 including this mount face 22 is formed as a flat face which is substantially matched on the lens optical axis Z1.

In the embodiment, a front-end edge of the general top face of the heat sink member 20 constitutes a shade 23. This shade 23 interrupts a part of the reflection light emitted from the semiconductor-type light source 10 and reflected on the reflecting surface 11a of the reflector 11, and forms a predetermined light distribution pattern having a cutoff line, for example a light distribution pattern for passing (low beam) by the remains of the reflected light.

In addition, in a case where the reflecting surface 11a of the reflector 11 is a first reflecting surface, a rear flat face of the shade 23 on the general top face of the heat sink member 20 is formed as a second reflecting surface 24 on which the reflection light reflected by the first reflecting surface 11a at the rear position of the lighting device with respect to the shade 23 is reflected in a front, obliquely upward direction toward an upper part of the projecting lens 12.

On the other hand, at a front-end upside part of the hood portion 11A of the reflector 11, a third reflecting surface 25 is formed for reflecting a part of the light emitted from the semiconductor-type light source 10 toward an immediately preceding position of the shade 23. This third reflecting surface 25 is formed on an oblique face bent forward at the inward rear of a swelling-out portion 11A1 by forming the swelling-out portion inwardly protruding in a cross-sectional inverted-triangle shape at the front-end upside part of the hood portion 11A.

In addition, a fourth reflecting surface 26 for reflecting the reflection light reflected on the third reflecting surface toward the upside part of the projecting lens 12 is formed at the immediately preceding part of the shade 23. This fourth reflecting surface 26 is formed as an oblique face inclined obliquely downwardly, and these third and fourth reflecting surfaces 25, 26 constitute reflecting surfaces for overhead sign, forming a light distribution pattern at an upward position with respect to the low-beam light distribution pattern.

A grinding face of aluminum die cast constituting the heat sink member 20 is mirror-finished by means of a grinding process, whereby the second reflecting surface 24 and the fourth reflecting surface 26 at the side of the heat sink member 20 are easily obtained.

The projecting lens 12 is mounted on the heat sink member 20 as a base of the light source unit 1 with its peripheral edge part being held and fixed on a lens holder 30, whereas this lens holder 30 is integrally molded with the heat sink member 20.

The lens holder 30 is provided with: a ring-shaped holder portion 31 having formed therein an annular groove 31a with which a peripheral-edge flange portion 12a of the projecting lens 12 engages; and a plurality of connecting arm portions 32 for connecting the holder portion 31 and the heat sink member 20 to each other.

The annular groove 31a of the holder portion 31, as shown in FIG. 5, is formed as a stepped groove, at a front-end inner circumference of the holder portion 31; and the peripheral-edge flange portion 12a of the projecting lens 12 is held and fixed by the stepped groove 31a and a retainer ring 33 which is securely attached to a front-end face of the holder portion 31.

The retainer ring 33 is formed of an appropriate synthetic resin material or a light metal material such as an aluminum alloy, and can be securely attached to the front-end face of the holder port 31 by swaging a plurality of lock pins 31b protruded on the front-end face of the holder portion 31.

At the substantial center part of its left and right side parts, the holder portion 31 is connected to a pair of left and right connecting arm portions 32 extended linearly from the front end of the heat sink member 20.

In the embodiment, the semiconductor-type light source 10, the reflector 11, and the projecting lens 12 are constituted as one light source unit 1, and a pair of the light source units 1, 1 is provided together in a transverse direction with the single heat sink member 20 serving as a base.

Afterwards, the reflectors 11, 11 of the pair of the left and right light source units 1, 1 are integrally connected to a connecting piece 11B at an inside lower-edge portion in the vehicle widthwise direction of hood portions 11A, 11A.

On the other hand, the lens holders 30, 30 are integrally connected to each other at an inside portion in the vehicle widthwise direction at the peripheral-edge part of holder portions 31, 31 of these holders, and is shaped just like an eyeglass frame. The connected center part of these holder portions 31, 31 and the center part in the vehicle widthwise direction at the front end of the heat sink member 20 are connected to each other by means of one connecting arm portion 32, and are commonly used as an inside connecting arm portion 32 in the vehicle widthwise direction of the left and right holder portions 31, 31.

In addition, with the connection of the holder portions 31, 31, left and right retainer rings 33, 33 are also integrally connected to each other at a inside portion in the vehicle widthwise direction of the peripheral-edge part of these rings.

In this way, a lighting unit 2 constituted by providing the two light source units 1, 1 at the left and right of the lighting unit with one heat sink member 20 serving as a base is assembled to be adjustable along an optical axis in the lamp room, by means of an aiming mechanism made of an aiming bolt and a pivot which are provided across the heat sink member 20 and a lamp housing which is not shown.

In the headlamp of the embodiment, made of the above constituent elements, the peripheries of the semiconductor-type light source 10 and the reflector 11 covering the semiconductor-type light source 10 are heated due to heat generation of the semiconductor-type light source 10, whereas the heat at the periphery of the semiconductor-type light source 10 is transmitted to the heat sink member 20, and is efficiently radiated by the heat sink member 20.

On the other hand, the periphery of the projecting lens 12 is heated due to the radiation heat exerted by light emission of the semiconductor-type light source, like the periphery of the semiconductor-type light source 10. However, the lens holder 30 holding the projecting lens 12 is integrally molded with the heat sink member 20. Therefore, the heat at the periphery of the projecting lens 12 is well transmitted to the heat sink member 20 by means of the lens holder 30, and is efficiently radiated by means of the heat sink member 20.

In this manner, according to a structure of the embodiment, a heat of which a temperature has risen at the periphery of the projecting lens 12 is also well thermally transmitted to the heat sink member 20 from the lens holder 30 integrally molded with the heat sink member 20, and is efficiently radiated by means of the heat sink member 20, so that a temperature difference from the periphery of the semiconductor-type light source 10 can be almost eliminated.

As a result, temperature regulation of the periphery of the projecting lens 12 can be thoroughly performed; a conventional slight displacement between the projecting lens 12 and the semiconductor-type light source 10 and the reflector 11 due to a thermal effect never arises; and the degradation of light distribution performance due to such thermal effect can be avoided.

In addition, even if the projecting lens is a light synthetic resin lens as described previously, the heat at the periphery of the projecting lens 12 can be efficiently radiated by means of the heat sink member 20 and the lens holder 30 molded integrally therewith, so that an occurrence of distortion due to the thermal effect of the projecting lens 12 can be avoided.

Further, the projecting lens 12 is held and fixed by the lens holder 30 integrally molded with the heat sink member 20, thus making it possible to avoid a displacement due to an error of assembling of the projecting lens 12, the semiconductor-type light source 10, and the reflector 11 and to improve light distribution performance in combination with the aforementioned heat radiation effect.

In particular, in the embodiment, the lens holder 30 is provided with: a ring-shaped holder portion 31 having formed therein an annular groove 31a with which a peripheral flange portion 12a of the projecting lens 12 engages; and a plurality of connecting arm portions 32 for connecting the holder portion 31 and the heat sink member 20 to each other. Further, an open space is provided between a respective one of the front ends of the reflector 11 and the heat sink member 20 and the projecting lens 12, so that heat radiation performance can be further improved without a heat being filled therebetween.

In addition, apart from such heat radiation effect, the annular groove 31a of the holder portion 31 is formed as a stepped groove at the front-end inner circumference of the holder portion 31; the peripheral-end flange portion 12a of the projecting lens 12 is engagingly locked to the stepped groove 31a from the front of the lighting device; with its front face side being retained by the retainer ring 33, the retainer ring 33 is securely attached and fixed to the front-end face of the holder portion 31, so that assembling properties of the projecting lens 12 can be improved.

Further, in the embodiment, in a pair of left and right light source units 1, 1 provided together, with one heat sink member 20 serving as a base, the reflector 11 and the lens holder 30 of these units are integrally connected to each other. Therefore, a positional relationship between the projecting lens 12 in each of the light source units 1 and the semiconductor-type light source 10 and the reflector can be made constant, i.e. the assembling precision can be enhanced without an occurrence of displacement, thus making it possible to prevent a displacement in cutoff line of a light distribution pattern of the left and right light source units 1, 1, exerted by a difference in positional relationship therebetween and to improve light distribution performance of a low-beam light distribution pattern.

While the embodiment exemplified a lighting unit 2 for forming low beams, in which a shade 23 was formed at the front-end edge of a mount face 22 of the heat sink member 20, it is of course possible to provide a lighting unit 2 for forming high beams without the shade 23.

In addition, while the embodiment described a headlamp for vehicle by taking an example, the present invention is also applicable to a rear combination lamp or a fog lamp.

What is claimed is:

1. A vehicle lighting device, comprising:
   (i) a light source;
   (ii) a reflector for reflecting a part of light emitted from the light source toward a forward direction of the lighting device;
   (iii) a projecting lens for focusing direct light from the light source and light reflected by the reflector to radiate the focused rays of light to the forward direction of the lighting device; and
   (iv) a heat sink member in which optical members including the light source and the reflector and a projecting lens are intensively disposed, wherein:
   the light source and the reflector each are fixed and disposed on a predetermined mount face formed on the heat sink member;
   the projecting lens is held and fixed by a lens holder at a peripheral edge part thereof, the light source, the reflector, and the projecting lens are combined in one light source unit;
   the one light source unit is provided in a plurality in the single heat sink member; and
   the lens holders and the reflectors in the light source units, are respectively integrally provided continuously to a vehicle width direction, and
   the each lens holder that is integrally provided continuously to a vehicle width direction, is integrally molded with the single heat sink member and contacts the each projection lens.

2. The vehicle lighting device according to claim 1, wherein:
   the lens holder comprises:
      a ring-shaped holder portion having formed therein an annular groove with which a peripheral edge flange portion of the projecting lens engages; and
      a plurality of connecting arm portions for connecting the holder portion and the heat sink member to each other.

3. The vehicle lighting device according to claim 2, wherein:
   the annular groove of the holder portion is formed as a stepped groove at a front-end inner periphery of the holder portion; and
   the peripheral edge flange portion of the projecting lens is held and fixed between the stepped groove and a retainer ring securely attached to a front-end face of the holder portion.

* * * * *